(12) United States Patent
Campbell et al.

(10) Patent No.: US 11,424,114 B2
(45) Date of Patent: Aug. 23, 2022

(54) PREDICTING MOLECULAR COLLISION CROSS-SECTION USING DIFFERENTIAL MOBILITY SPECTROMETRY

(71) Applicant: DH TECHNOLOGIES DEVELOPMENT PTE. LTD., Singapore (SG)

(72) Inventors: John Lawrence Campbell, Milton (CA); Scott Hopkins, Waterloo (CA)

(73) Assignee: DH Technologies Development Pte. Ltd., Singapore (SG)

( * ) Notice: Subject to any disclaimer, the term of this patent is extended or adjusted under 35 U.S.C. 154(b) by 260 days.

(21) Appl. No.: 16/767,760

(22) PCT Filed: Nov. 19, 2018

(86) PCT No.: PCT/IB2018/059109
§ 371 (c)(1),
(2) Date: May 28, 2020

(87) PCT Pub. No.: WO2019/106483
PCT Pub. Date: Jun. 6, 2019

(65) Prior Publication Data
US 2021/0366699 A1    Nov. 25, 2021

Related U.S. Application Data

(60) Provisional application No. 62/591,356, filed on Nov. 28, 2017.

(51) Int. Cl.
*H01J 49/00* (2006.01)
*G06N 20/20* (2019.01)
(Continued)

(52) U.S. Cl.
CPC .......... *H01J 49/0036* (2013.01); *G01N 27/62* (2013.01); *G01N 27/623* (2021.01); *G06N 20/20* (2019.01)

(58) Field of Classification Search
None
See application file for complete search history.

(56) References Cited

U.S. PATENT DOCUMENTS

2011/0183431 A1*  7/2011  Covey ............... H01J 49/26
                                                          250/282
2013/0037710 A1    2/2013  Wu
                           (Continued)

OTHER PUBLICATIONS

International Search Report and Written Opinion for PCT/IB2018/059109, dated Mar. 4, 2019.

*Primary Examiner* — Roy Y Yi
*Assistant Examiner* — Geoffrey T Evans
(74) *Attorney, Agent, or Firm* — Kasha Law LLC; John R. Kasha; Kelly L. Kasha

(57) ABSTRACT

A plurality of known compounds with known CCS values is analyzed using a DMS device. The DMS device determines how the intensities of their transmitted ions vary with different separation voltages (SVs) and compensation voltages (CVs). A machine learning algorithm builds a data model from the known m/z value, known CCS value, and measured pairs of CV and SV values that provide optimal transmission through the DMS device for each of the known compounds. An unknown compound with an unknown CCS value is then analyzed. The DMS device determines how the intensity of its ions varies with the same different SVs and CVs. Finally, the machine learning algorithm predicts the CCS value of the unknown compound from the data model, the known m/z of the unknown compound, and the measured pairs of CV and SV values that provide optimal transmission through the DMS device for the unknown compound.

15 Claims, 7 Drawing Sheets

(51) Int. Cl.
    *G01N 27/62*     (2021.01)
    *G01N 27/623*    (2021.01)

(56) References Cited

U.S. PATENT DOCUMENTS

| | | |
|---|---|---|
| 2013/0092834 A1 | 4/2013 | Covey et al. |
| 2016/0334369 A1 | 11/2016 | Covey et al. |
| 2017/0125235 A1 | 5/2017 | Green et al. |
| 2017/0191963 A1 | 7/2017 | Clemmer et al. |

* cited by examiner

PREDICTING MOLECULAR COLLISION CROSS-SECTION USING DIFFERENTIAL MOBILITY SPECTROMETRY

CROSS REFERENCE TO RELATED APPLICATION

This application claims the benefit of U.S. Provisional Patent Application Ser. No. 62/259,356, filed Nov. 28, 2017, the content of which is incorporated by reference herein in its entirety.

INTRODUCTION

The teachings herein relate to operating a differential mobility spectrometry (DMS) device and a mass spectrometer to predict the collision cross-section (CCS) of an unknown compound in a sample. More particularly, the teachings herein relate to systems and methods that analyze a plurality of known compounds with known CCS values and known mass-to-charge ratios (m/z) values using a DMS device. The DMS device is used to determine how the intensities of their transmitted ions vary with a plurality of different separation voltages (SVs) and compensation voltages (CVs). A machine learning algorithm is used to build a data model from the known m/z value, known CCS value, and measured pairs of CV and SV values that provide optimal transmission through the DMS device for each of the plurality of known compounds. An unknown compound with an unknown CCS value but a known m/z value is then analyzed using the DMS device. The DMS device is used to determine how the intensity of its ions varies with the same plurality of different SVs and CVs. Finally, the machine learning algorithm is used to predict the CCS of the unknown compound from the data model, the known m/z of the unknown compound, and the measured pairs of CV and SV values that provide optimal transmission through the DMS device for the unknown compound.

The systems and methods disclosed herein can be performed in conjunction with a processor, controller, microcontroller, or computer system, such as the computer system of FIG. 1.

Collision Cross-Section Background

Jody et al., Anal Chem. 2017 Jan. 17; 89(2), 1032-1044, (hereinafter the "Jody Paper") defines the collision cross-section (CCS) in ion mobility technologies combined with mass spectrometry (IMS-MS) as "an observational property that averages all geometric orientations and interaction types (head-on, 'glancing', and 'orbiting' collisions, multiple collisions within cavities of the analyte, etc.) across the experimental measurement time." Further, the Jody Paper describes that "the empirical CCS is a macroscopic quantity which is specific to the identity of the drift gas as well as the temperature and electric field used during the measurement, and so by the strictest definition, CCS is not an intrinsic property of the analyte, although it is very closely linked to one (namely the microscopic cross section of the analyte). Mathematically, the CCS represents the area of a circle, and thus the structural information is 'coarse-grained' in nature."

Bijlsma et al., Anal. Chem. 2017, 89, 6583-6589, (hereinafter the "Bijlsma Paper") describes that one reason CCS values are useful is because they can provide a third dimension "(alongside retention time and exact mass) to identify compounds." The Bijlsma Paper also finds that CCS values are particularly advantageous for identifying compounds because "they are unaffected by the sample matrix and are consistent between instruments and across a range of experimental conditions."

Unfortunately, the Bijlsma Paper reports that "there is currently no empirical CCS library, so any suspect or nontarget compounds will not be able to be identified or confirmed on the basis of CCS. For this reason, prediction of CCS has become an area of great interest with various computational means being used, predominantly for small molecules and peptides." The Bijlsma Paper proposes using an artificial neural network (ANN) to predict CCS values based on eight molecular descriptors.

Similarly, Zhou et al., Anal. Chem., 2016, 88 (22), 11084-11091, (hereinafter the "Zhou Paper") has described the development of a database of predicted CCS values for untargeted metabolites. The Zhou Paper describes using "a machine-learning algorithm called support vector regression (SVR) to develop a prediction method that utilized 14 common molecular descriptors to predict CCS values for metabolites." Wikipedia, for example, as of July 2018, defines machine learning as "a subset of artificial intelligence in the field of computer science that often uses statistical techniques to give computers the ability to "learn" (i.e., progressively improve performance on a specific task) with data, without being explicitly programmed."

Both the Bijlsma Paper and the Zhou Paper address the need for methods of predicting the CCS values of unknown compounds. Unfortunately, both papers rely on a large number of molecular descriptors. As a result, simpler systems and methods are needed to predict the CCS values of unknown compounds.

SUMMARY

A system, method, and computer program product are disclosed for predicting the CCS of an unknown compound using a DMS device. The system includes an ion source device, a DMS device, and a mass spectrometer. All three embodiments include the following steps.

A machine learning data model is built by instructing an ion source device to ionize each sample of a plurality of samples and transmit resulting ions to the DMS device using the processor. Each sample includes a different known compound with a known mass-to-charge ratio (m/z) value and a known CCS value. The DMS device is configured to transmit ions received from the ion source device based on a CV and an SV.

For each ionized sample, every permutation of M SV values and N CV values is applied to the DMS device, producing a total of M×N ion transmissions from the DMS device using the processor. For each of the M×N ion transmissions, a mass filter of the mass spectrometer is instructed to select a transmitted ion with a known m/z of a known compound of the sample and a mass analyzer of the mass spectrometer is instructed to measure an intensity of the selected ion using the processor, producing M×N intensity measurements.

From the M×N intensity measurements, either a CV value for each of the M SV values that resulted in the highest intensity is selected, producing M pairs of CV and SV values, or an SV value for each of the N CV values that resulted in the highest intensity is selected, producing N pairs of CV and SV values using the processor. A machine learning algorithm is applied to build a data model from a known m/z value, a known CCS value, and either M or N pairs of CV and SV values for each known compound of each sample using the processor.

A CCS value of an unknown compound is predicted from the data model by instructing the ion source device to ionize a sample that includes an unknown compound with a known m/z value and transmit resulting ions to the DMS device using the processor. Every permutation of M SV values and N CV values is applied to the DMS device using the processor, producing a total of M×N ion transmissions from the DMS device. For each of the M×N ion transmissions, the mass filter is instructed to select a transmitted ion with the known m/z of the unknown compound of the sample and the mass analyzer is instructed to measure an intensity of the selected ion using the processor, producing M×N intensity measurements.

From the M×N intensity measurements, either a CV value for each of the M SV values that resulted in the highest intensity is selected, producing M pairs of CV and SV values or an SV value for each of the N CV values that resulted in the highest intensity is selected, producing N pairs of CV and SV values using the processor. A CCS value for the unknown compound is predicted by applying the known m/z value and either M or N pairs of CV and SV values for the unknown compound to the data model.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
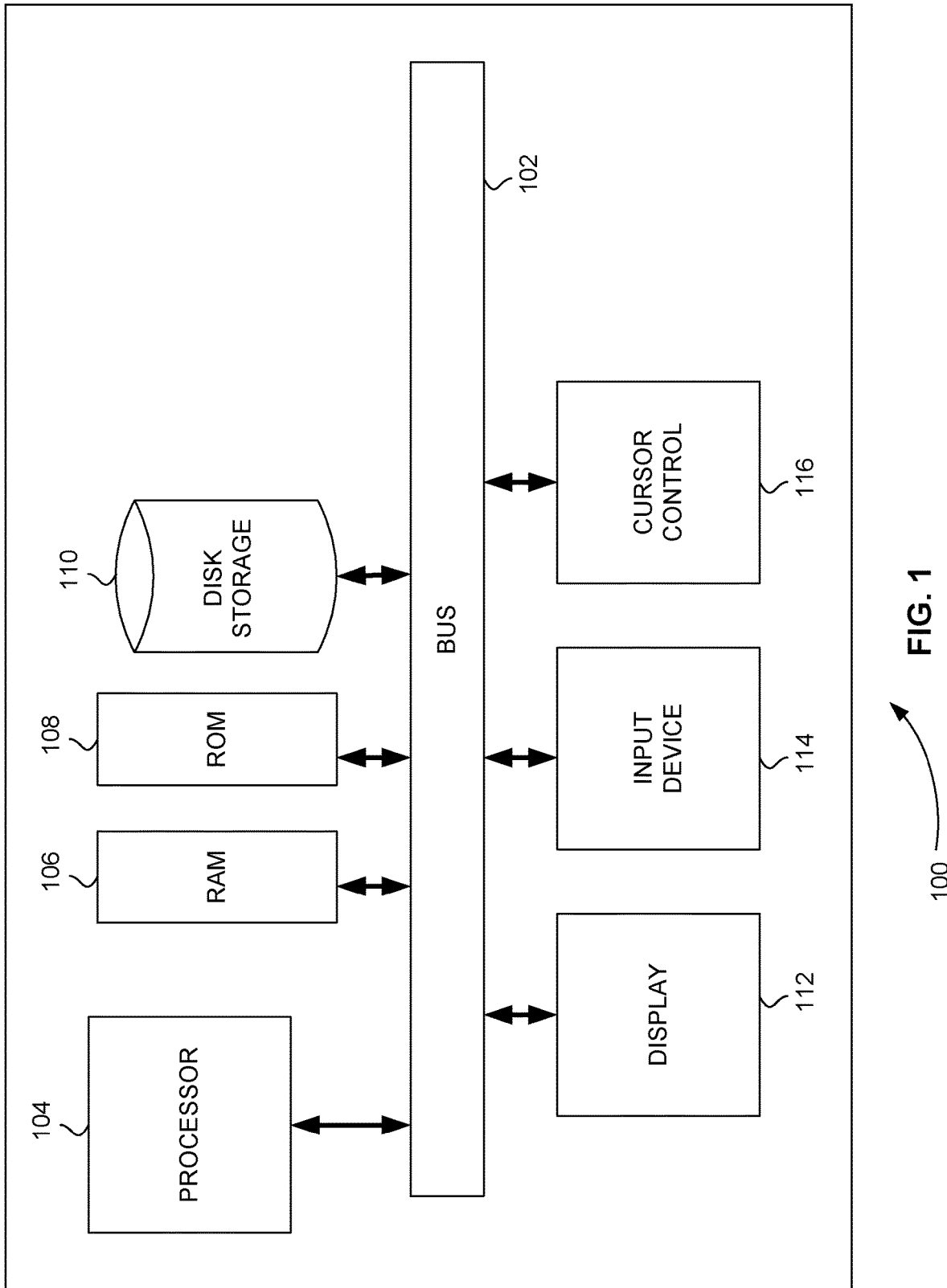
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus implementations of the present teachings are not limited to any specific combination of hardware circuitry and software.

In various embodiments, computer system 100 can be connected to one or more other computer systems, like computer system 100, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Differential Mobility Spectrometry (DMS)

Figure 2:
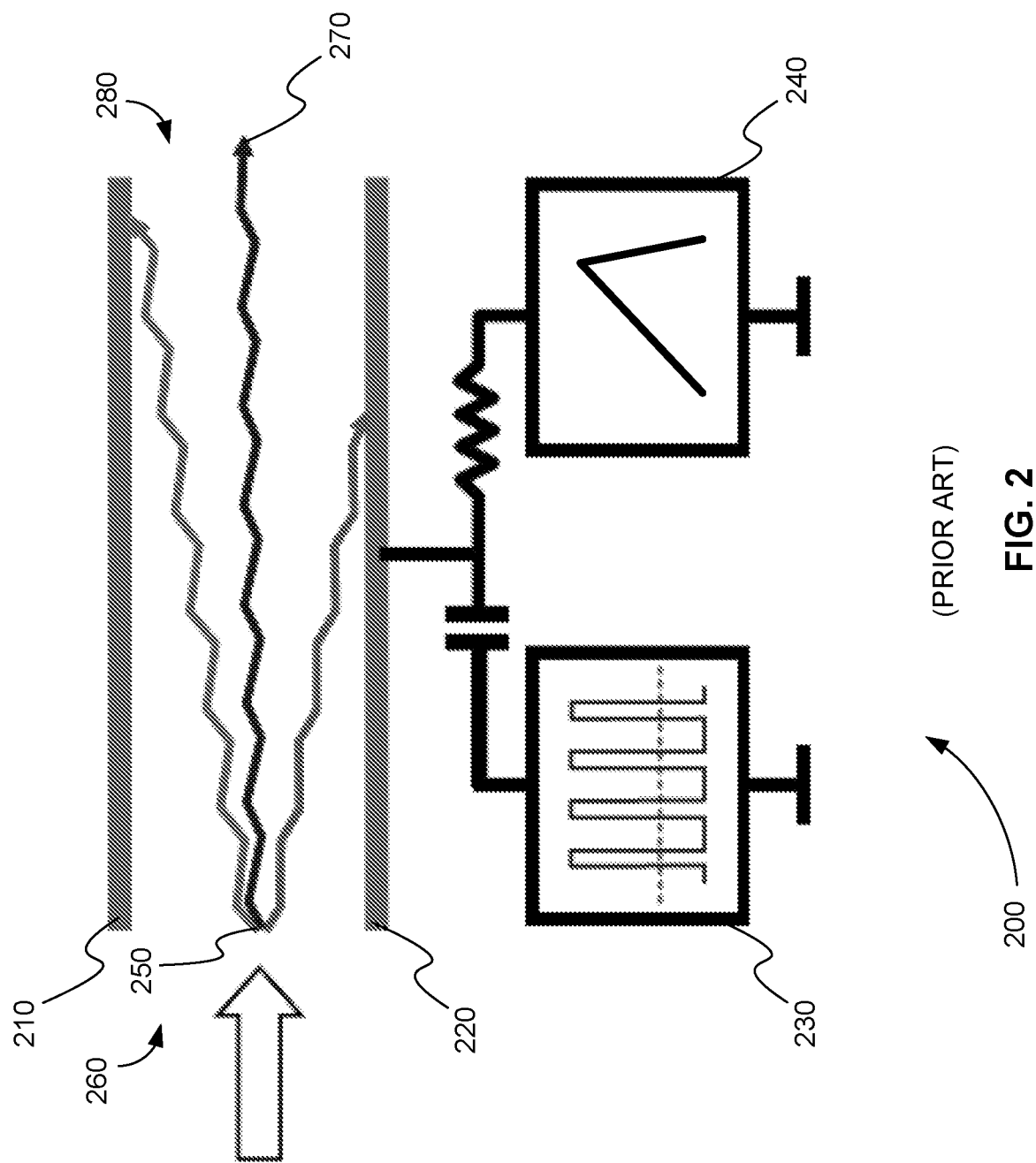
FIG. 2 is a schematic diagram of an exemplary differential mobility spectrometry (DMS) device.

FIG. 2 is a schematic diagram 200 of an exemplary DMS device. DMS device 200 includes two parallel flat plates, plate 210 and plate 220. Radio frequency (RF) voltage source 230 applies an RF separation voltage (SV) across plate 210 and plate 220, and direct current (DC) voltage source 240 applies a DC compensation voltage (CV) across plate 210 and plate 220. Ions 250 enter DMS device 200 in a transport gas at opening 260. The separation of ions 250 in DMS device 200 is based upon differences in their migration rates under high versus low electric fields.

Unlike traditional ion mobility, ions 250 are not separated in time as they traverse the device. Instead, ions 250 are separated in trajectory based on the difference in their mobility between the high field and low field portions of the applied RF voltage source 230. The high field is applied between plate 210 and plate 220 for a short period of time, and then a low field is applied in the opposite direction for a longer period of time. Any difference between the low-field and high-field mobility of an ion of a compound of interest causes it to migrate towards one of the plates. The ion is steered back towards the center-line of the device by the application of a second voltage offset, known as the CV of DC voltage source 240, a compound-specific parameter that can be used to selectively filter out all other ions. Rapid switching of the CV allows the user to concurrently monitor many different compounds. Ions 270 selected by the combination of SV and CV, leave DMS device 200 through opening 280 to the remainder of the mass spectrometer (not shown). DMS device 200 is located between an ion source device (not shown) and the remainder of the mass spectrometer, for example.

In general, DMS device 200 has two modes of operation. In the first mode, DMS device 200 is on, SV and CV voltages are applied, and ions are separated. This is, for example, the enabled mode.

In the second mode of operation, DMS device 200 is off, the SV is set to zero and ions 250 are simply transported from opening 260 to opening 280. This is, for example, the disabled or transparent mode of DMS device 200.

In the enabled mode, DMS device 500 can acquire data for a single MRM transition in 25 milliseconds (ms), for example, including an inter-scan pause time of 20 ms. In transparent mode, the delay through DMS device 500 is negligible.

Systems and Methods for Predicting Ccs Values Based on DMS Measurements

As described above, the prediction of collision cross-section (CCS) values is useful because, for example, they can provide a third dimension in addition to retention time and exact mass to identify compounds. Unfortunately, there is currently no empirical CCS library that can be used to identify a large number of known compounds. As a result, a variety of computational techniques have been developed to predict CCS values from molecular descriptors. Unfortunately, most of these techniques rely on large numbers of these molecular descriptors. As a result, simpler systems and methods are needed to predict the CCS values of unknown compounds.

In various embodiments, a differential mobility spectrometry (DMS) device is used to predict CCS values of unknown compounds. As described above, a DMS device includes two parallel flat plates. A radio frequency (RF) voltage source applies an RF separation voltage (SV) across the two plates. A direct current (DC) voltage source applies a DC compensation voltage (CV) across the two plates.

Unlike traditional ion mobility technologies combined with mass spectrometry (IMS-MS), ions are not separated in time as they traverse a DMS device. Instead, ions are separated in trajectory based on the difference in their mobility between the high field and low field portions of the applied RF voltage source. Any difference between the low-field and high-field mobility of an ion of a compound of interest causes it to migrate towards one of the plates. The ion is steered back towards the center-line of the device by the application of a second voltage offset, known as the CV of the DC voltage source. Ions selected by the combination of SV and CV leave the DMS device to the remainder of a mass spectrometer.

Because a DMS device operates in a manner significantly different from traditional IMS-MS devices, it has not previously been used or even considered to predict CCS values. Indeed, some experts in the field have described that DMS (also known as high-field asymmetric waveform ion mobility spectrometry—or FAIMS) displays a "substantial orthogonality" compared to IMS-MS. See Guevremont et al., Anal. Chem. 2000, 72, 4577-4584; Tang et al., Anal. Chem. 2005, 77, 6381-6388.

Another reason DMS has not been used to predict CCS values is because it is a very dynamic environment. In DMS, a rapidly oscillating electric field that can change by a couple of orders of magnitude is applied to influence the trajectory of a charged molecule. So, charged molecules are constantly being pushed and pulled to influence their trajectory. In contrast, in traditional drift tube IMS-MS, for example, a low direct current (DC) is applied to measure the relatively slower drift motion of charged molecules over time.

Liu et al., ACS Central Science, 2017, 3, 101-109, (hereinafter the Liu Paper") did attempt to correlate some individual physicochemical properties to DMS data. The Liu Paper, for example, described how one physicochemical property correlated to a single property of the DMS data. For example, the DMS behavior of a series of drug molecules was found to correlate strongly to those molecules relative cell permeability. The theory was that the ions, that exhibited specific SV and CV patterns when analyzed by DMS in the presence of protic solvent vapor (water), did so due to their interaction energies with the protic solvent molecules. The same fundamental interactions between water (a protic molecule) and the drug molecules is theorized by medicinal chemists to be a major barrier to successful drug transport across a lipid bilayer (e.g., cell wall). However, a DMS device was not used to predict CCS values.

In various embodiments, systems and methods are applied that work backward from the approach taken in prior publications, like the Liu Paper. In prior publications, it is first determined how one property correlates to another property. Solving for a particular property is then a matter of applying a linear regression to a two-dimensional correlation plot.

In contrast, in the systems and methods described herein, the first step is to correlate all the different parameters of the DMS device in a machine learning model. These different parameters include the mass-to-charge ratio (m/z), which is known from the mass spectrometer, and the SV and CV values. The model is then trained with known CCS values of known compounds. Once the model is trained with data from a few hundred known compounds, it is used to predict the CCS value of an unknown compound.

In various embodiments, the machine learning model is expanded to predict other properties of unknown molecules or compounds. This is done by modifying the chemical environment. In other words, the machine learning model is expanded to include an indicator of the DMS chemical environment used by the DMS device. The DMS chemical environment can include, but is not limited to, the DMS chemical modifier used, the temperature inside the DMS device, and the pressure inside the DMS device. A DMS chemical modifier is, for example, the gas introduced into a DMS device. How ions interact with the DMS chemical modifier, a given temperature and pressure, and the oscillating electric field determine their trajectory through the DMS device.

So, for example, if the DMS chemical modifier is changed from pure nitrogen to mostly nitrogen with small amount of water vapor or mostly nitrogen with a small amount of methanol vapor, different physicochemical properties can be determined. These physicochemical properties include, but are not limited to, cell permeability, pKa, and pKb. To determine a physicochemical property other than CCS, the machine learning model is trained with data obtained using a DMS chemical modifier related to that physicochemical property. So, in addition to training the machine learning model with, m/z, CCS, SV, and CV values, the model is trained with an indicator of a DMS chemical environment.

Training the machine learning model involves gathering measurement data. This measurement data is gathered by analyzing compounds with known CCS values using a DMS device and mass spectrometer. Preferably, at least 200 known compounds or molecules with a wide range of different known CCS values are selected for analysis. A sample of each of the known compounds is ionized and transmitted to a DMS device. In various alternative embodiments, two or more known compounds can be ionized from the same sample and transmitted to the DMS device.

When the ions of each known compound are received by the DMS device, the SV and CV values are ramped in preset increments. For each permutation of SV and CV values, the mass spectrometer selects the m/z of the ion of the known compound and measures its intensity. The result is a series of intensity measurements that represent all permutations of SV and CV values.

From these intensity measurements, the machine learning model is preferably trained only with the CV value for each SV value that provides optimal transmission of the ion of the known compound. In other words, the machine learning model is preferably trained only with the CV value for each SV value that produces the highest intensity measurement. A plot of the CV value for each SV value that produces the highest intensity measurement is referred to as a DMS dispersion plot.

Figure 3:
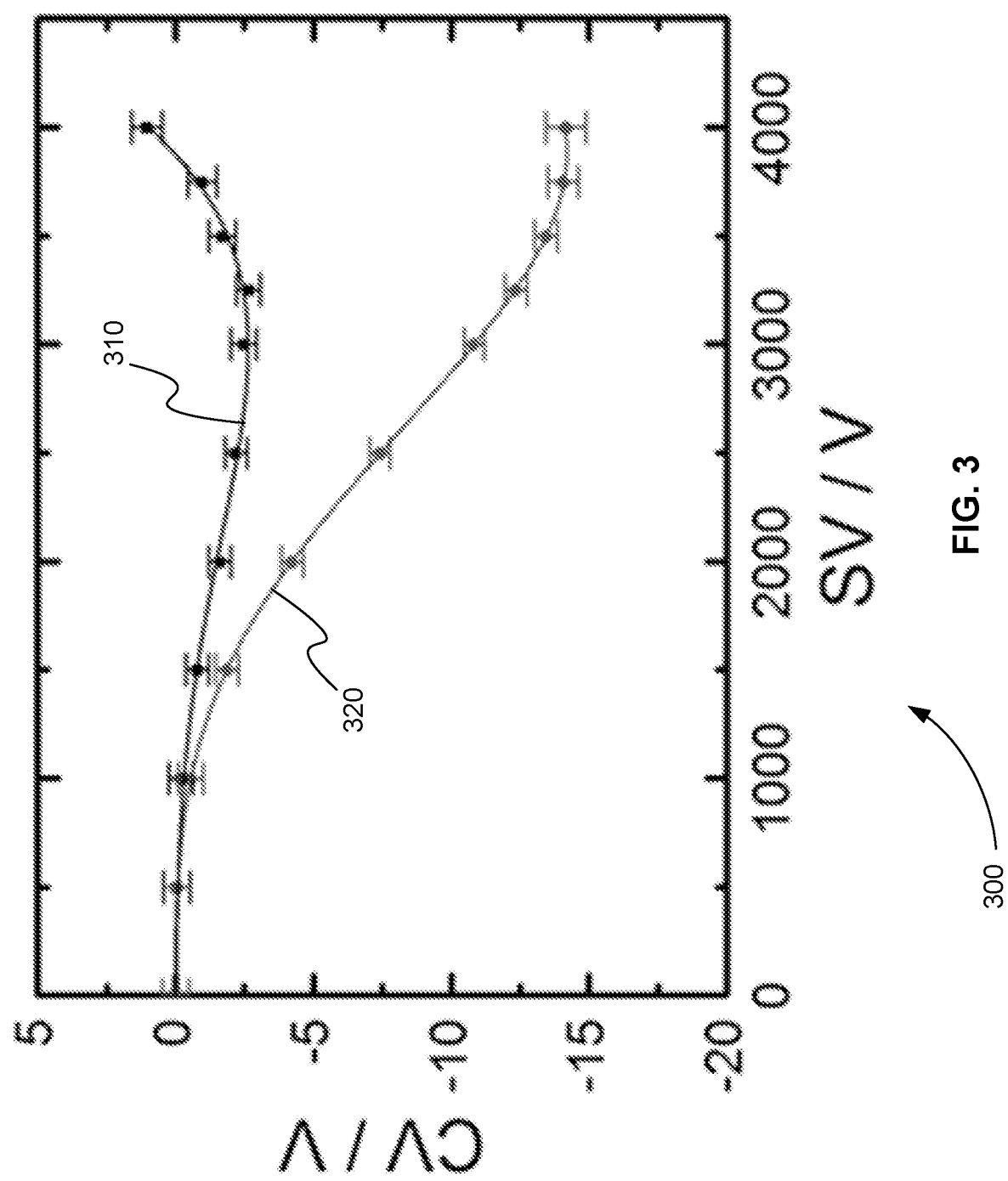
FIG. 3 is an exemplary DMS dispersion plot showing the optimal compensation voltage (CV) and separation voltage (SV) values for ion transmission of two known compounds with different collision cross-sections (CCSs), in accordance with various embodiments.

FIG. 3 is an exemplary DMS dispersion plot 300 showing the optimal compensation voltage (CV) and separation voltage (SV) values for ion transmission of two known compounds with different collision cross-sections (CCSs), in accordance with various embodiments. Line 310 is fitted to the optimal CV and SV values of a first compound with a first known CCS. Line 320 is fitted to the optimal CV and SV values of a second compound with a second known CCS. The SV values in FIG. 3 are varied between 0 and 4,000 Volts, and CV values are varied between −20 and 5 Volts. FIG. 3 shows how the correlation of CV values with SV values can vary significantly as the result of different CCS values. Specifically, FIG. 3 shows that the correlation of CV values with SV values changes noticeably between SV values of 1,000 and 4,000 due to the differences in CCS values of the compounds.

In FIG. 3, the CV values are plotted as a function of the SV values. As one of ordinary skill in the art understands, and in various alternative embodiments, the machine learning model can alternatively be trained with an SV value for each CV value that provides optimal transmission of the ion of the known compound. A similar plot can then be generated showing the SV values as a function of the CV values.

By training the machine learning model with hundreds of CV and SV correlations, a data model is built. This machine learning data model is then used to determine the CCS value of an unknown compound.

This compound is unknown in the sense that its CCS is unknown. Its m/z may be known or may have been found experimentally, and even its structure may be known. It may, for example, be a metabolite of a known compound.

A sample containing the unknown compound is ionized and transmitted to the DMS device. When the ions of the unknown compound are received by the DMS device, the SV and CV values are again ramped in the same preset increments. For each permutation of SV and CV values, the mass spectrometer selects the m/z of the ion of the unknown compound and measures its intensity. The result is a series of intensity measurements that represent all permutations of SV and CV values.

From these intensity measurements, as before, only the CV value for each SV value that provides optimal transmission of the ion of the known compound is used to determine the CCS value of the unknown compound. The same machine learning algorithm that built machine learning data model takes this data and performs a 4-dimensional regression with machine learning data model. The result is a predicted CCS value for the unknown compound.

Figure 4:
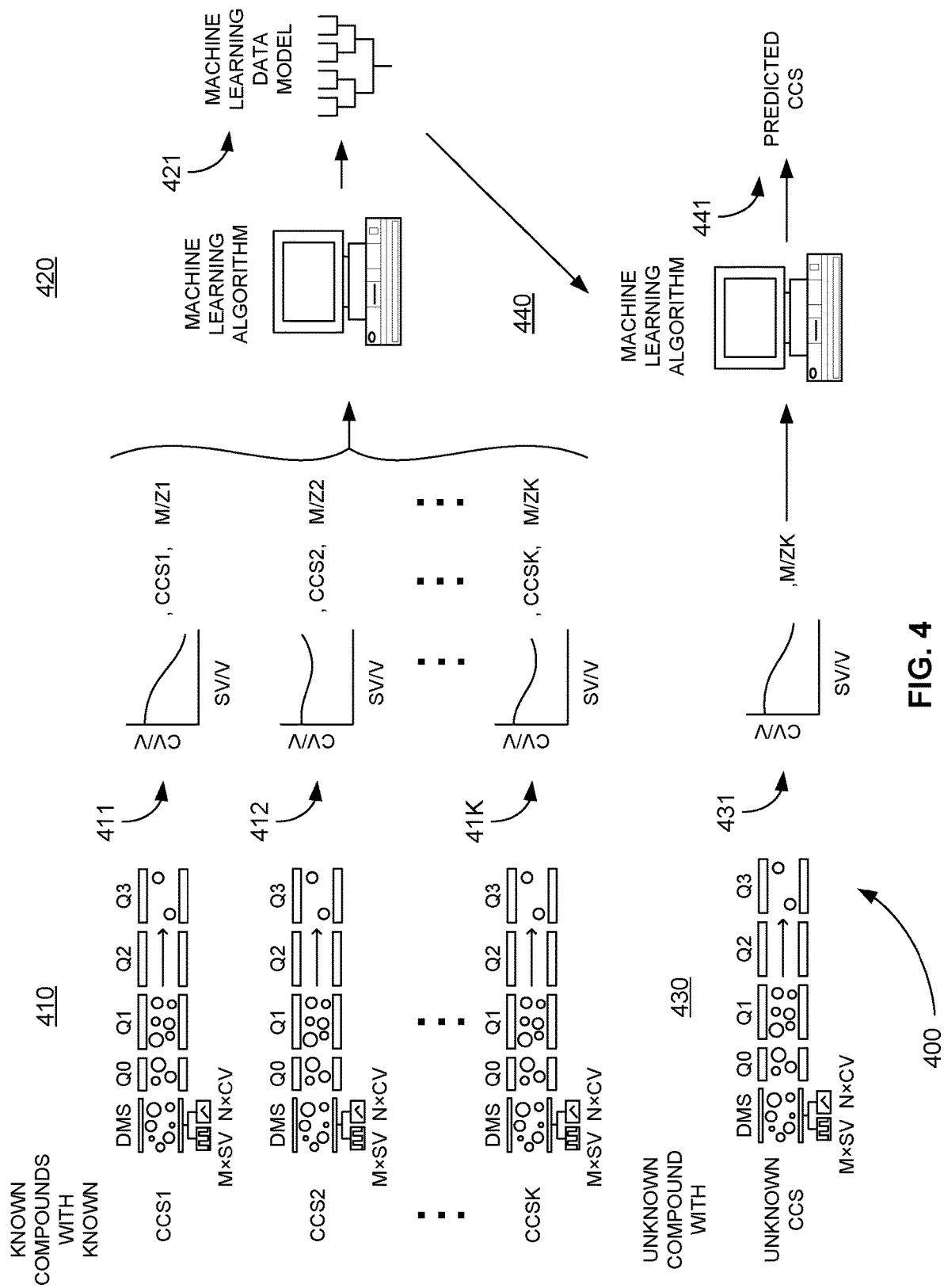
FIG. 4 is an exemplary schematic diagram showing how DMS measurement data is obtained and used to predict the collision cross-section (CCS) of an unknown compound, in accordance with various embodiments.

FIG. 4 is an exemplary schematic diagram 400 showing how DMS measurement data is obtained and used to predict the collision cross-section (CCS) of an unknown compound, in accordance with various embodiments. In step 410, K compounds with known CCS values are analyzed using a DMS device coupled to a mass spectrometer. For each compound, M SV values are stepwise applied to the DMS device and, for each SV value, N CV values are stepwise applied to the DMS device. As a result, a total of M×N different voltage combinations are applied, producing M×N separate ion transmissions from the DMS device that are analyzed by the mass spectrometer.

For each of the M×N ion transmissions, the mass spectrometer selects a transmitted ion with a known m/z of the known compound and measures the intensity of the selected ion. This produces M×N intensity measurements. These measurements are further refined to determine the correlation between CV and SV values for optimal ion transmission.

For example, a CV value for each of the M SV values that resulted in the highest intensity is selected. This produces M pairs of CV and SV values that resulted in the highest intensity. In FIG. 4, these M pairs of CV and SV values that resulted in the highest intensity for each of the K known compounds are represented by dispersion plots 411, 412, . . . , 41K.

In step 420, the known CCS value, m/z value, and measured M pairs of CV and SV values for each of the K known compounds 411, 412, . . . , 41K are provided as input to a machine learning algorithm. The machine learning algorithm produces a machine learning data model 421 from this data.

In step 430, a compound with an unknown CCS value is analyzed using a DMS device coupled to a mass spectrometer. Again, the same M SV values are stepwise applied to the DMS device and, for each SV value, the same N CV values are stepwise applied to the DMS device. As a result, M×N different voltage combinations are applied, producing M×N separate ion transmissions from the DMS device that are analyzed by the mass spectrometer.

For each of the M×N ion transmissions, the mass spectrometer selects a transmitted ion with a known m/z of the unknown compound and measures the intensity of the selected ion. This produces M×N intensity measurements. These measurements are also further refined to determine the correlation between CV and SV values for optimal ion transmission.

Again, a CV value for each of the M SV values that resulted in the highest intensity is selected. This produces M pairs of CV and SV values that resulted in the highest intensity. In FIG. 4, these M pairs of CV and SV values that resulted in the highest intensity for the unknown compound are represented by dispersion plot 431.

In step 440, the known m/z value and measured M pairs of CV and SV values for the unknown compound 431 are provided as inputs to data model 421. From these inputs, data model 421 predicts CCS value 441 for the unknown compound. The machine learning algorithm is used to, for example, to provide the inputs to data model 421 and to receive predicted CCS value 441.

In FIG. 4, a CCS value is predicted by training the machine learning model with measurement data from compounds with a range of different CCS values. In various embodiments, other physicochemical properties (not shown) are predicted by training the machine learning model with measurement data from compounds with a range of different CCS values and with a range of different chemical environments applied within the DMS device.

System for Predicting the CCS of an Unknown Compound

Figure 5:
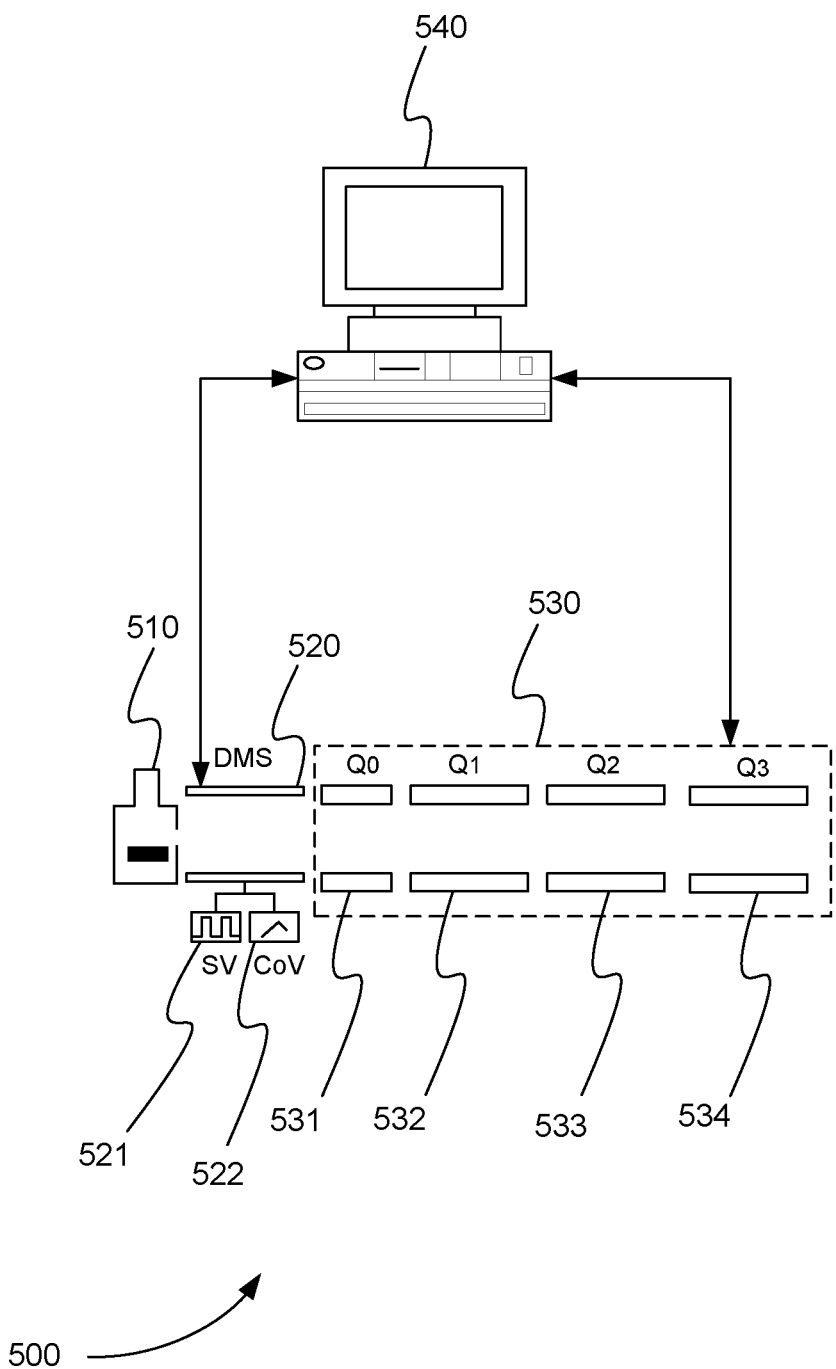
FIG. 5 is a schematic diagram of a system for predicting the CCS of an unknown compound using a DMS device, in accordance with various embodiments.

FIG. 5 is a schematic diagram 500 of a system for predicting the CCS of an unknown compound using a DMS device, in accordance with various embodiments. The system of FIG. 5 includes ion source device 510, DMS device 520, mass spectrometer 530, and processor 540.

Ion source device 510 is configured to receive a sample and ionize the sample. Ion source device 510 uses a technique that includes, but is not limited to, electrospray ionization (ESI) (e.g., nanospray) or matrix-assisted laser desorption/ionization (MALDI), for example.

DMS device 520 is configured to transmit ions received from the ion source based on SV 521 and CV 522. An exemplary DMS device is the SELEXION™ device produced by SCIEX.

Mass spectrometer 530 includes mass filter 532 and mass analyzer 534. Mass spectrometer 530 may further include ion guide 531 and collision cell 533, for example. Mass spectrometer 530 is configured to select ions received from DMS device 520 based on m/z using mass filter 532 and measure the intensities of selected ions using mass analyzer 534.

Mass filter 532 is shown as quadrupole. However, mass filter 532 can be any type of mass filter.

Mass analyzer 534 is shown as a quadrupole mass analyzer. However, mass analyzer 534 can be any type of mass analyzer. Mass analyzer 534 can include, but is not limited to, a time-of-flight (TOF) device, a quadrupole, an ion trap, a linear ion trap, an orbitrap, a magnetic four-sector mass analyzer, a hybrid quadrupole time-of-flight (Q-TOF) mass analyzer, or a Fourier transform mass analyzer.

Processor 540 is in communication with, ion source device 510, DMS device 520, and mass spectrometer 530. Processor 540 can be, but is not limited to, the system of FIG. 1, a computer, microprocessor, microcontroller, or any device capable of sending and receiving control signals and data to and from ion source device 510, DMS device 520, and mass spectrometer 530 and other devices. Processor 540 further has access to one or more memory devices, like the system of FIG. 1.

Processor 540 builds a machine learning data model. Processor 540 does this by instructing ion source device 510 to ionize each sample of a plurality of samples and transmit resulting ions to DMS device 520. Each sample includes a different known compound with a known m/z value and a known CCS value, for example. In various alternative embodiments, a sample can contain two or more known compounds.

For each ionized sample, processor 540 stepwise applies every permutation of M SV values and N CV values to DMS device 520. This produces a total of M×N ion transmissions from DMS device 520. For each of the M×N ion transmissions, processor 540 instructs mass filter 532 to select a transmitted ion with a known m/z of a known compound of the sample and instructs mass analyzer 534 to measure an intensity of the selected ion. This produces M×N intensity measurements.

From the M×N intensity measurements, processor 540 selects a CV value for each of the M SV values that resulted in the highest intensity, producing M pairs of CV and SV values. In various alternative embodiments, processor 540 selects an SV value for each of the N CV values that resulted in the highest intensity, producing N pairs of CV and SV values.

In various embodiments, processor 540 stores a known m/z value, a known CCS value, and either M or N pairs of CV and SV values for each known compound to a memory (not shown). The memory can be any type of memory device including, but not limited to, the memory devices of FIG. 1.

Processor 540 applies a machine learning algorithm to build a data model from a known m/z value, a known CCS value, and either M or N pairs of CV and SV values for each known compound of each sample. The machine learning algorithm preferably includes a random forest regression algorithm. In various alternative embodiments, the machine learning algorithm can include, but is not limited to, a K nearest-neighbors algorithm, a decision tree algorithm, or an adaptive boosting algorithm.

Processor 540 then predicts a CCS value of an unknown compound from the data model. Processor 540 instructs ion source device 510 to ionize a sample that includes an unknown compound with a known m/z value and transmit resulting ions to DMS device 520.

Processor 540 stepwise applies every permutation of M SV values and N CV values to DMS device 520. This produces a total of M×N ion transmissions from DMS device 520.

For each of the M×N ion transmissions, processor 540 instructs mass filter 532 to select a transmitted ion with the known m/z of the unknown compound of the sample and instructs mass analyzer 534 to measure an intensity of the selected ion. This produces M×N intensity measurements.

From the M×N intensity measurements, processor 540 either selects a CV value for each of the M SV values that resulted in the highest intensity, producing M pairs of CV and SV values. Or, processor 540 selects an SV value for each of the N CV values that resulted in the highest intensity, producing N pairs of CV and SV values. In various embodiments, processor 540 stores the known m/z value and either M or N pairs of CV and SV values for the unknown compound to the memory.

Finally, processor 540 predicts a CCS value for the unknown compound. It does this by applying the known m/z value and either M or N pairs of CV and SV values for the unknown compound to the data model. The machine learning algorithm is used to apply the known m/z value and either M or N pairs of CV and SV values for the unknown compound to the data model, for example.

In various embodiments, processor 540 further builds the machine learning data model by applying the machine learning algorithm to build a data model from an indicator of a DMS chemical environment in addition to a known m/z value, a known CCS value, and either M or N pairs of CV and SV values for each known compound of each sample.

Processor 540 predicts a CCS value of an unknown compound from the data model by further applying the indicator of a DMS chemical environment in addition to the known m/z value and either M or N pairs of CV and SV values for the unknown compound to the data model.

In various embodiments, the predicted CCS and the known m/z value and either M or N pairs of CV and SV values for the unknown compound can be provided as inputs to the machine learning algorithm to update the data model with this additional information. In this way, the machine learning algorithm learns from its own predictions.

In various embodiments, the indicator of a DMS chemical environment includes an indicator of a DMS chemical modifier. The DMS chemical modifier can include, but is not limited, nitrogen, water vapor, or methanol. The indicator of a DMS chemical modifier can include a name and amount. For example, "an $N_2$ environment seeded with methanol vapor (1.5% v/v)" can be an indicator of a DMS chemical modifier.

In various embodiments, the indicator of a DMS chemical environment can include an indicator of a temperature or a pressure.

In various embodiments, processor 540 further predicts a physicochemical property of the unknown compound other than the CCS value. As described above, the data model can be built by analyzing known compounds under different DMS chemical environments. In addition, these different DMS chemical environments can include different DMS chemical modifiers. Processor 540 can then predict a physicochemical property of the unknown compound based on the DMS chemical modifier used to analyze the unknown compound. Specifically, processor 540 applies the indicator of a DMS chemical modifier in addition to the known m/z value and either M or N pairs of CV and SV values for the unknown compound to the data model to predict a physicochemical property for the unknown compound. The physicochemical property can include, but is not limited to, CCS, cell permeability, pKa, and pKb.

Method for Predicting the CCS of an Unknown Compound

Figure 6:
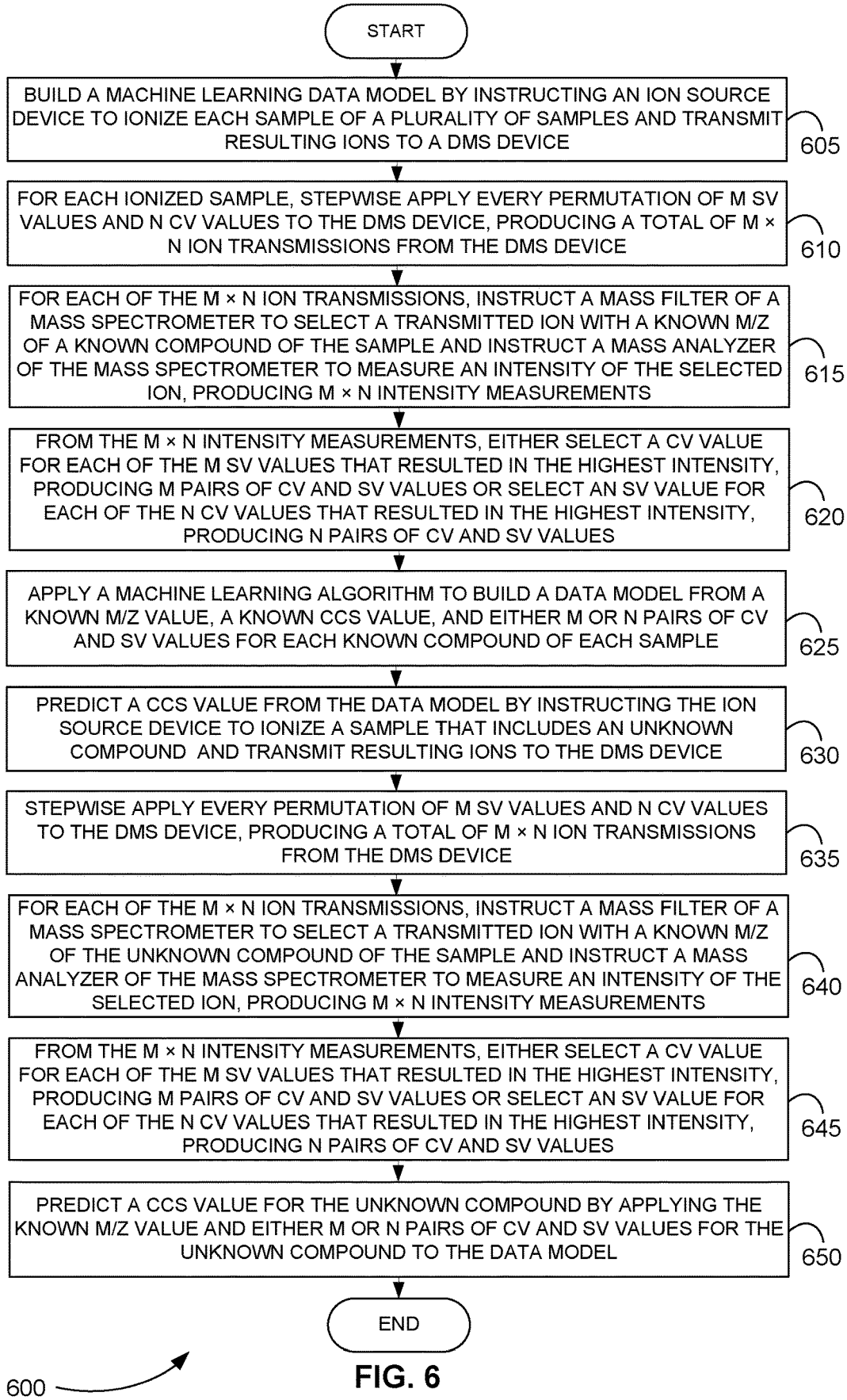
FIG. 6 is a flowchart showing a method for predicting the CCS of an unknown compound using a DMS device, in accordance with various embodiments.

FIG. 6 is a flowchart 600 showing a method for predicting the CCS of an unknown compound using a DMS device, in accordance with various embodiments.

In step 605 of method 600, a machine learning data model is built by instructing an ion source device to ionize each sample of a plurality of samples and transmit resulting ions to a DMS device using a processor. Each sample includes a different known compound with a known mass-to-charge ratio (m/z) value and a known CCS value. The DMS device is configured to transmit ions received from the ion source device based on a CV and an SV.

In step 610, for each ionized sample, every permutation of M SV values and N CV values is applied to the DMS device, producing a total of M×N ion transmissions from the DMS device using the processor.

In step 615, for each of the M×N ion transmissions, a mass filter of a mass spectrometer is instructed to select a transmitted ion with a known m/z of a known compound of the sample and a mass analyzer of the mass spectrometer is instructed to measure an intensity of the selected ion using the processor, producing M×N intensity measurements.

In step 620, from the M×N intensity measurements, either a CV value for each of the M SV values that resulted in the highest intensity is selected, producing M pairs of CV and SV values or an SV value for each of the N CV values that resulted in the highest intensity is selected, producing N pairs of CV and SV values using the processor.

In step 625, a machine learning algorithm is applied to build a data model from a known m/z value, a known CCS value, and either M or N pairs of CV and SV values for each known compound of each sample using the processor.

In step 630, a CCS value of an unknown compound is predicted from the data model by instructing the ion source device to ionize a sample that includes an unknown compound with a known m/z value and transmit resulting ions to the DMS device using the processor.

In step 635, every permutation of M SV values and N CV values is applied to the DMS device using the processor, producing a total of M×N ion transmissions from the DMS device.

In step 640, for each of the M×N ion transmissions, the mass filter is instructed to select a transmitted ion with the known m/z of the unknown compound of the sample and the mass analyzer is instructed to measure an intensity of the selected ion using the processor, producing M×N intensity measurements.

In step 645, from the M×N intensity measurements, either a CV value for each of the M SV values that resulted in the highest intensity is selected, producing M pairs of CV and SV values or an SV value for each of the N CV values that resulted in the highest intensity is selected, producing N pairs of CV and SV values using the processor.

In step 650, a CCS value for the unknown compound is predicted by applying the known m/z value and either M or N pairs of CV and SV values for the unknown compound to the data model using the processor.

Computer Program Product for Predicting the CCS of an Unknown Compound

In various embodiments, computer program products include a tangible computer-readable storage medium whose contents include a program with instructions being executed on a processor so as to perform a method for predicting the CCS of an unknown compound using a DMS device. This method is performed by a system that includes one or more distinct software modules.

Figure 7:
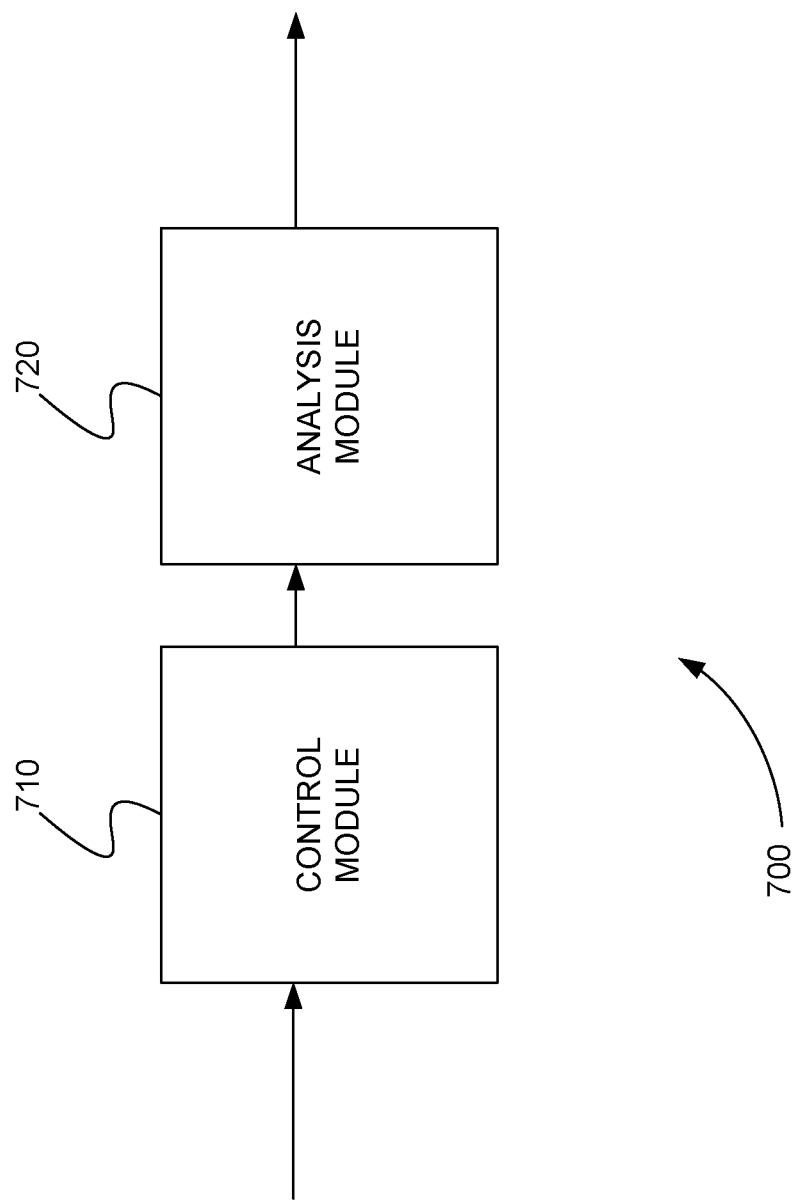
FIG. 7 is a schematic diagram of a system that includes one or more distinct software modules that perform a method for predicting the CCS of an unknown compound using a DMS device, in accordance with various embodiments.

FIG. 7 is a schematic diagram of a system 700 that includes one or more distinct software modules that perform a method for predicting the CCS of an unknown compound using a DMS device, in accordance with various embodiments. System 1300 includes a control module 710 and an analysis module 720.

Control module 710 builds a machine learning data model by instructing an ion source device to ionize each sample of a plurality of samples and transmit resulting ions to a DMS. Each sample includes a different known compound with a known m/z value and a known CCS value. The DMS device is configured to transmit ions received from the ion source device based on a CV and an SV.

For each ionized sample, control module 710 stepwise applies every permutation of M SV values and N CV values to the DMS device, producing a total of M×N ion transmissions from the DMS device. For each of the M×N ion transmissions, control module 710 instructs a mass filter of a mass spectrometer to select a transmitted ion with a known m/z of a known compound of the sample and instructs a mass analyzer of the mass spectrometer to measure an intensity of the selected ion, producing M×N intensity measurements.

From the M×N intensity measurements, analysis module 720 either selects a CV value for each of the M SV values that resulted in the highest intensity, producing M pairs of CV and SV values or selects an SV value for each of the N CV values that resulted in the highest intensity, producing N pairs of CV and SV values. Analysis module 720 applies a machine learning algorithm to build a data model from a known m/z value, a known CCS value, and either M or N pairs of CV and SV values for each known compound of each sample.

Control module 710 predicts a CCS value of an unknown compound from the data model by instructing the ion source device to ionize a sample that includes an unknown compound with a known m/z value and transmit resulting ions to the DMS device. Control module 710 stepwise applies every permutation of M SV values and N CV values to the DMS device, producing a total of M×N ion transmissions from the DMS device. For each of the M×N ion transmissions, control module 710 instructs the mass filter to select a transmitted ion with the known m/z of the unknown compound of the sample and instructs the mass analyzer to measure an intensity of the selected ion, producing M×N intensity measurements.

From the M×N intensity measurements, analysis module 720 either selects a CV value for each of the M SV values that resulted in the highest intensity, producing M pairs of CV and SV values or selecting an SV value for each of the N CV values that resulted in the highest intensity, producing N pairs of CV and SV values. Analysis module 720 predicts a CCS value for the unknown compound by applying the known m/z value and either M or N pairs of CV and SV values for the unknown compound to the data model.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for predicting the collision cross-section (CCS) of an unknown compound using a differential mobility spectrometry (DMS) device, comprising:
   an ion source device configured to receive a sample and ionize the sample;
   a DMS device configured to transmit ions received from the ion source device based on a compensation voltage (CV) and a separation voltage (SV);
   a mass spectrometer that includes a mass filter and a mass analyzer and that is configured to select ions received from the DMS device based on mass-to-charge ratio (m/z) using the mass filter and measure the intensities of selected ions using the mass analyzer; and
   a processor in communication with the ion source device, the DMS device, and the mass spectrometer that
   builds a machine learning data model by
      instructing the ion source device to ionize each sample of a plurality of samples and transmit resulting ions to the DMS device, wherein each sample includes a different known compound with a known m/z value and a known CCS value,
      for each ionized sample, stepwise applying every permutation of M SV values and N CV values to the DMS device, producing a total of M×N ion transmissions from the DMS device, for each of the M×N ion transmissions, instructing the mass filter to select a transmitted ion with a known m/z of a known compound of the sample and instructing the mass analyzer to measure an intensity of the selected ion, producing M×N intensity measurements, and, from the M×N intensity measurements, either selecting a CV value for each of the M SV values that resulted in the highest intensity, producing M pairs of CV and SV values or selecting an SV value for each of the N CV values that resulted in the highest intensity, producing N pairs of CV and SV values, and applying a machine learning algorithm to build a data model from a known m/z value, a known CCS value, and either M or N pairs of CV and SV values for each known compound of each sample, and predicts a CCS value of an unknown compound from the data model by instructing the ion source device to ionize a sample that includes an unknown compound with a known m/z value and transmit resulting ions to the DMS device, stepwise applying every permutation of M SV values and N CV values to the DMS device, producing a total of M×N ion transmissions from the DMS device, for each of the M×N ion transmissions, instructing the mass filter to select a transmitted ion with the known m/z of the unknown compound of the sample and instructing the mass analyzer to measure an intensity of the selected ion, producing M×N intensity measurements, and, from the M×N intensity measurements, either selecting a CV value for each of the M SV values that resulted in the highest intensity, producing M pairs of CV and SV values or selecting an SV value for each of the N CV values that resulted in the highest intensity, producing N pairs of CV and SV values, and predicting a CCS value for the unknown compound by applying the known m/z value and either M or N pairs of CV and SV values for the unknown compound to the data model.

2. The system of claim 1, wherein the machine learning algorithm comprises a random forest regression algorithm.

3. The system of claim 1, wherein the machine learning algorithm comprises a K nearest-neighbors algorithm.

4. The system of claim 1, wherein the machine learning algorithm comprises a decision tree algorithm.

5. The system of claim 1, wherein the machine learning algorithm comprises an adaptive boosting algorithm.

6. The system of claim 1, wherein the processor builds the machine learning data model by further applying the machine learning algorithm to build a data model from an indicator of a DMS chemical environment in addition to a known m/z value, a known CCS value, and either M or N pairs of CV and SV values for each known compound of each sample, and predicts a CCS value of an unknown compound from the data model by further predicting a CCS value for the unknown compound by applying the indicator of a DMS chemical environment in addition to the known m/z value and either M or N pairs of CV and SV values for the unknown compound to the data model.

7. The system of claim 6, wherein the indicator of a DMS chemical environment includes an indicator of a DMS chemical modifier.

8. The system of claim 7, wherein the DMS chemical modifier includes nitrogen, water vapor, or methanol.

9. The system of claim 6, wherein the indicator of a DMS chemical environment includes an indicator of a temperature or a pressure.

10. The system of claim 7, wherein the processor further predicts a physicochemical property of the unknown compound by applying the indicator of a DMS chemical modifier in addition to the known m/z value and either M or N pairs of CV and SV values for the unknown compound to the data model.

11. The system of claim 10, wherein the physicochemical property includes cell permeability.

12. The system of claim 10, wherein the physicochemical property includes pKa.

13. The system of claim 10, wherein the physicochemical property includes pKb.

14. A method for predicting the collision cross-section (CCS) of an unknown compound using a differential mobility spectrometry (DMS) device, comprising:

building a machine learning data model by instructing an ion source device to ionize each sample of a plurality of samples and transmit resulting ions to a DMS device using a processor, wherein each sample includes a different known compound with a known mass-to-charge ratio (m/z) value and a known CCS value, and wherein the DMS device is configured to transmit ions received from the ion source device based on a compensation voltage (CV) and a separation voltage (SV), for each ionized sample, stepwise applying every permutation of M SV values and N CV values to the DMS device, producing a total of M×N ion transmissions from the DMS device, for each of the M×N ion transmissions, instructing a mass filter of a mass spectrometer to select a transmitted ion with a known m/z of a known compound of the sample and instructing a mass analyzer of the mass spectrometer to measure an intensity of the selected ion, producing M×N intensity measurements, and, from the M×N intensity measurements, either selecting a CV value for each of the M SV values that resulted in the highest intensity, producing M pairs of CV and SV values or selecting an SV value for each of the N CV values that resulted in the highest intensity, producing N pairs of CV and SV values, and applying a machine learning algorithm to build a data model from a known m/z value, a known CCS value, and either M or N pairs of CV and SV values for each known compound of each sample using the processor; and predicting a CCS value of an unknown compound from the data model by instructing the ion source device to ionize a sample that includes an unknown compound with a known m/z value and transmit resulting ions to the DMS device using the processor, stepwise applying every permutation of M SV values and N CV values to the DMS device, producing a total of M×N ion transmissions from the DMS device, for each of the M×N ion transmissions, instructing the mass filter to select a transmitted ion with the known m/z of the unknown compound of the sample and instructing the mass analyzer to measure an intensity of the selected ion, producing M×N intensity measurements, and, from the M×N intensity measurements, either selecting a CV value for each of the M SV values that resulted in the highest intensity, producing M pairs of CV and SV values or selecting an SV value for each of the N CV values that resulted in the highest intensity, producing N pairs of CV and SV values, and predicting a CCS value for the unknown compound by applying the known m/z value and either M or N pairs of CV and SV values for the unknown compound to the data model using the processor.

15. A computer program product, comprising a non-transitory and tangible computer-readable storage medium whose contents include a program with instructions being executed on a processor to perform a method for predicting the collision cross-section (CCS) of an unknown compound using a differential mobility spectrometry (DMS) device, the method comprising:

providing a system, wherein the system comprises one or more distinct software modules, and wherein the distinct software modules comprise a control module and an analysis module;

building a machine learning data model by instructing an ion source device to ionize each sample of a plurality of samples and transmit resulting ions to a differential mobility spectrometry (DMS) device using the control module, wherein each sample includes a different known compound with a known mass-to-charge ratio (m/z) value and a known CCS value, and wherein the DMS device is configured to transmit ions received from the ion source device based on a compensation voltage (CV) and a separation voltage (SV), for each ionized sample, stepwise applying every permutation of M SV values and N CV values to the DMS device, producing a total of M×N ion transmissions from the DMS device, for each of the M×N ion transmissions, instructing a mass filter of a mass spectrometer to select a transmitted ion with a known m/z of a known compound of the sample and instructing a mass analyzer of the mass spectrometer to measure an intensity of the selected ion, producing M×N intensity measurements, and, from the M×N intensity measurements, either selecting a CV value for each of the M SV values that resulted in the highest intensity, producing M pairs of CV and SV values or selecting an SV value for each of the N CV values that resulted in the highest intensity, producing N pairs of CV and SV values, and applying a machine learning algorithm to build a data model from a known m/z value, a known CCS value, and either M or N pairs of CV and SV values for each known compound of each sample using the analysis module; and predicting a CCS value of an unknown compound from the data model by instructing the ion source device to ionize a sample that includes an unknown compound with a known m/z value and transmit resulting ions to the DMS device using the control module, stepwise applying every permutation of M SV values and N CV values to the DMS device, producing a total of M×N ion transmissions from the DMS device, for each of the M×N ion transmissions, instructing the mass filter to select a transmitted ion with the known m/z of the unknown compound of the sample and instructing the mass analyzer to measure an intensity of the selected ion, producing M×N intensity measurements, and, from the M×N intensity measurements, either selecting a CV value for each of the M SV values that resulted in the highest intensity, producing M pairs of CV and SV values or selecting an SV value for each of the N CV values that resulted in the highest intensity, producing N pairs of CV and SV values, and predicting a CCS value for the unknown compound by applying the known m/z value and either M or N pairs of CV and SV values for the unknown compound to the data model using the analysis module.

* * * * *